3,704,261
PREPARATION OF SILICON HYDRIDES
Abe Berger, Schenectady, and Frederick M. Lewis, Burnt
 Hills, N.Y., assignors to General Electric Company
No Drawing. Filed Oct. 18, 1971, Ser. No. 190,401
Int. Cl. C07f 17/08
U.S. Cl. 260—448.2 E                     15 Claims

ABSTRACT OF THE DISCLOSURE

A method is provided for converting organosilicon halides, for example, halosilanes and bis(halosilyl)hydrocarbons, to the corresponding hydrides. Silicon halide reduction is effected by utilizing certain organometallic hydrides.

BACKGROUND OF THE INVENTION

Prior to the present invention, various methods were known for reducing silicon halides as illustrated by the equation, (1)    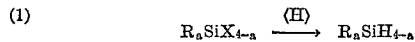

where R is selected from monovalent hydrocarbon radicals and halogenated monovalent hydrocarbon radicals, X is a halogen radical, and $a$ is an integer equal to from 1 to 3, inclusive. One method that can be used to reduce silicon halides involves the use of lithium aluminum hydride in an ether solvent. Although this procedure can be satisfactorily employed for making a variety of silicon hydrides, those skilled in the art know that it is not economically feasible to utilize lithium aluminum hydride in commercial operations. Other methods are shown by Jenkner, Pats. 3,043,857 and 3,100,778. These patents show the reduction of halides of certain Group IV elements, for example, organohalosilanes, by the employment of sodium hydride utilizing hydrogen gas under pressure, or a combination of sodium hydride and a promoter in the form of a metallic organic compound such as an alkyl aluminum. These methods achieve effective results but have many limitations. For example, the employment of in situ sodium hydride utilizing hydrogen gas under pressure in combination with sodium metal, requires the use of high pressure equipment. Such equipment can be expensive and present a safety hazard. Alternatively, although the alkyl aluminum can be employed effectively to reduce organohalosilanes substituted with monovalent hydrocarbon radicals, the use of alkyl aluminums often present problems of contamination. For example, in instances where the boiling points of the resulting silicon hydride and alkyl aluminum overlap, separation of the silicon hydride free of alkyl aluminum often can be extremely difficult. In addition, when alkyl aluminums are employed to promote the reduction of organohalosilane, reaction times can often exceed 24 hours or more and yields of the corresponding silicon hydride are low.

A recent method for reducing silicon halides wherein an alkali metal hydride and an alkyl aluminum halide are employed to reduce the silicon halides is described in U.S. Pat. 3,496,206. Although the process described in U.S. Pat. 3,496,206 overcomes many of the problems previously encountered when converting organosilicon halides to the corresponding hydrides, it has a few limitations. For example, alkyl aluminum halides must be carefully handled since they are unstable and ignite on exposure to oxygen or water. Also, the alkyl aluminum halides when contacted with the skin cause severe blistering. Moreover, such halides are difficult to handle since they are quite volatile. In addition, the use of the alkyl aluminum halides in such reactions is quite expensive. The alkyl aluminum halides are relatively expensive raw materials and are not recovered from the reaction medium since they form stable complexes with the alkali metal halides generated in the reaction. The formation of these complexes emits heat thereby requiring that the reaction be closely monitored. In addition, it is generally necessary to employ corrosion resistant reaction vessels since corrosion causing materials are emitted in the reaction when alkyl aluminum halides are employed.

The present invention provides a process for converting organosilicon halides to the corresponding hydrides which is effective and safe. Moreover, the process of the present invention is economically feasible for commercial operations. Also the method of the present invention does not require extra-ordinary safety precautions.

SUMMARY OF THE INVENTION

The process of the present invention comprises reacting:

(A) an effective amount of organometallic hydride having the structural formula:

(2)    

wherein L is an alkali metal or an alkaline earth metal; $y$ is the valence of L; Me is a metal from group III–A of the periodic table; each $R^2$ individually is a monovalent hydrocarbon radical such as alkyl, alkaryl, aryl, aralkyl, and cycloalkyl; and $z$ is a whole number integer from 1 to 3, inclusive; and (B) organosilicon halide selected from organohalosilanes of formula:

(3)    

or bis(halosilyl)hydrocarbons of the formula:

(4)    

where R, X, and $a$ are defined above; R' is a divalent hydrocarbon radical; $b$ is a whole number which has a value equal to 0 to 2, inclusive; $c$ is a whole number which has a value equal to 0 to 2, inclusive; $d$ is a whole number which has a value equal to form 0 to 2, inclusive; $e$ is a whole number which has a value equal to 0 to 2, inclusive; $f$ is a whole number which has a value equal to 0 to 2, inclusive; the sum of $a$ and $b$ has a value equal to 1 to 3, inclusive; the sum of $c$ and $d$ has a value equal to 0 to 2, inclusive; and the sum of $e$ and $f$ has a value equal to 0 to 2, inclusive.

DESCRIPTION OF PREFERRED EMBODIMENTS

The present invention provides a method for preparing organosilicon hydrides selected from silanes of the formula:

(5)    

and bis(silyl)hydrocarbons of the formula:

(6)    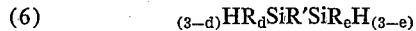

where R, R', $a$, $d$, and $e$ are as defined above.

Radicals included by R of Formula 1 are, for example, aryl radicals and halogenated aryl radicals, such as phenyl, chlorophenyl, napthyl, chloronapthyl, etc.; aliphatic radicals such as for example, methyl, ethyl, n-propyl, isopropyl, n-butyl, sec-butyl, tert-butyl, amyl, hexyl, heptyl, octyl, dodecyl, pentadecyl, octadecyl; alkenyl radicals such as vinyl, 1-propenyl, allyl etc.; cycloalkyl radicals such as cyclohexyl, cycloheptyl, etc.; haloalkyl radicals such as chlorobutyl, chloroamyl, chlorooctyl, chlorodecyl, etc. Radicals included by R' are arylene radicals such as phenylene, naphthylene, anthrylene, etc.; alkylene radicals such as methylene, ethylene, propylene, butylene, pentylene, etc.

Organohalosilanes included by Formula 3 are, for example, methyltrichlorosilane, methylphenyldichlorosilane, methyldichlorosilane, ethyltrichlorosilane, ethylchlorosilane, n-propyltrichlorosilane, n-butyltrichlorosilane, n-amyltrichlorosilane, n-amyldichlorosilane, n-amylchlorosilane, n-hexyltrichlorosilane, n-hexyldichlorosilane, n-hexylchlorosilane, phenyltrichlorosilane, chlorophenyltrichlorosilane, ethylmethyldichlorosilane, diphenyldichlorosilane, diphenylchlorosilane, n-propyl n-octyldichlorosilane, tri-n-propylchlorosilane, etc.

Bis(halosilyl)hydrocarbons included by Formula 4 are for example, bis(chlorodimethylsilyl)methane, bis(trichlorosilyl)methane, 1,2-bis(trichlorosilyl)ethane, 1,2-bis(dichlorosilyl)ethane, 1,3-bis(trichlorosilyl)propane, 1,4-bis-(methyldibromosilyl)butane, 1,8-bis(dichlorosilyl)octane, p-bis(dichlorosilyl)benzene, etc.

The organometallic hydrides suitable in the present invention have the following structural formula:

(2) 

wherein L is an alkali metal or an alkaline earth metal; $y$ is the valence of L; Me is a metal from Group III–A of the periodic table; each $R^2$ individually is an alkyl radical and/or aryl radical and/or cycloalkyl radical and/or aralkyl and/or alkaryl; and $z$ is a whole number integer from 1 to 3, inclusive.

Some alkali metals and alkaline earth metals which are suitable constituents of the organometallic hydrides of Formula 2 above include sodium, potassium, lithium, rubidium, cesium, magnesium, calcium, strontium, and barium. Preferably sodium is employed as the alkali metal or alkaline earth metal substituents of the organometallic hydrides of Formula 2.

Some metals of Group III–A of the periodic table which are suitable components of the organometallic hydrides employed in the present invention include boron, aluminum, gallium, and indium. The preferred Group III–A metals employed as substituents of the organometallic hydrides of Formula 2 are boron and aluminum with aluminum being the most preferred.

$R^2$ in Formula 2 above is a monovalent organic radical which may be an alkyl radical, an aryl radical, a cycloalkyl radical, an aralkyl or an alkyaryl. Generally the alkyl radicals contain from 1 to about 18 carbon atoms, and preferably from about 1 to 10 carbon atoms. Some suitable alkyl radicals include methyl, ethyl, isopropyl, isobutyl, amyl, 2-ethyl hexyl, nonyl, decyl, and octadecyl. The most preferred alkyl radicals are methyl and ethyl. The aryl radicals suitable in the present invention include mononuclear and polynuclear radicals. Some suitable aryl radicals include phenyl, naphthyl, phenanthryl, and anthracyl, of which phenyl is the most preferred. Generally the aryl radicals contain from about 6 to 14 carbon atoms.

The cycloalkyl radicals suitable as $R^2$ in Formula 2 usually contain from about 3 to about 12 carbon atoms, and preferably from about 4 to 8 carbon atoms. Included among such cycloalkyl radicals are cyclopropyl, cyclobutyl, cyclopentyl, cyclohexyl, cycloheptyl, cyclooctyl, and cyclododecyl.

Generally the aralkyl radicals contain from 7 to about 18 carbon atoms. Included among such aralkyl radicals are phenylethyl and naphthylethyl. Usually the alkaryl radicals suitable as $R^2$ in Formula 2 contain from 7 to about 18 carbon atoms. Included among such alkaryl radicals are xylyl, tolyl and cumyl.

Most preferably $R^2$ in Formula 2 is an alkyl radical and is methyl or ethyl. It is understood, of cource, that compounds corresponding to Formula 2 may include mixtures of monovalent hydrocarbon radicals as the $R^2$ portion of the compound.

$z$ is a whole number from 1 to 3, inclusive, and preferably is 2.

$y$ is the valence of L which is either 1 or 2.

Some specific compounds which correspond to Formula 2 and are suitable in the present invention include sodium diethyl aluminum dihydride; sodium diethyl boron dihydride; sodium ethyl aluminum trihydride; sodium triethyl aluminum hydride; sodium dimethyl aluminum dihydride; sodium methyl ethyl aluminum dihydride; sodium triethyl aluminum hydride; sodium trimethyl aluminum hydride; sodium methyl aluminum trihydride, sodium dimethyl boron dihydride, sodium diphenyl aluminum dihydride, sodium diphenyl boron dihydride, sodium dicyclobutyl aluminum dihydride, sodium dicyclohexyl aluminum dihydride, sodium ethyl phenyl aluminum dihydride, lithium diethyl aluminum dihydride, lithium dimethyl aluminum dihydride, lithium diethyl boron dihydride, lithium dimethyl boron dihydride, potassium diethyl aluminum dihydride, potassium dimethyl aluminum dihydride, calcium-bis-(diethyl aluminum dihydride), and magnesium-bis(diethyl aluminum dihydride). It is of course, understood that mixtures of such compounds can be employed in the process of the present invention. Methods for preparing the aforementioned organometallic hydrides can be found in E. L. Ashby et al., Inorganic Chemistry, volume No. 2, page 499, 1963.

The reaction between the organosilicon halides and the organometallic hydrides can achieve yields as high as 95% in reaction times as little as ½ hour or less under atmospheric conditions. For complete conversion of the silicon halide to the corresponding silicon hydride, it is preferred that the organometallic hydride be employed in an amount so as to provide at least about one mole of chemically combined hydrogen per mole of halogen chemically bonded to silicon metal. The present reaction is quite useful since the organosilicon hydrides can be recovered from the reaction medium free from contamination due to the organometallic hydride by vaporization and subsequent condensation. An organometallic halide corresponding to the organometallic hydride reactant is formed in the reaction. The halide formed in the reaction can be readily regenerated to form the relatively non-volatile organometallic hydride reactant by simple reduction with a relatively inexpensive alkali metal hydride such as sodium hydride, thereby facilitating recovery of the organosilicon hydride free from contamination due to the organometallic hydride. Moreover, this renders the reaction quite feasible from a commercial and economic viewpoint since the organometallic hydride unlike the previously employed reactants or promoters for such reduction reactions can be recovered and reused.

Although the advantages of the present invention are readily attainable by the reaction between only the organosilicon halide and the organometallic hydride, it is preferred that the reaction further be carried out in the presence of an alkali metal hydride. This modification of the present invention is particularly advantageous since the organometallic halide surprisingly functions as a promoter for the reduction of the organosilicon halide by the alkali metal hydride. Accordingly, the quantity of the relatively expensive organometallic hydride can be significantly reduced as compared to those reactions carried out in the absence of the alkali metal hydride without a loss in the yield of desired organosilicon hydride. Furthermore, the regeneration of the organometallic hydride is effected in situ during the reaction when an alkali metal hydride is present.

Included by the alkali metal hydrides that can be employed in the present invention are, for example, sodium hydride, potassium hydride, lithium hydride, rubidium hydride, and cesium hydride. Preferably, sodium hydride is employed in the method of the present invention.

When the reaction includes an alkali metal hydride, desirable results can be achieved if there is utilized in the reaction mixture sufficient organometallic hydride to provide from 0.01 mole to 1 mole, and preferably from about 0.05 mole to about 0.7 mole of chemically combined hydrogen per mole of halogen chemically bonded to silicon metal. Desirable results can be achieved also if there is utilized in the reaction mixture sufficient alkali metal hydride to provide for at least 1 mole and generally up to about 1.1 moles of chemically combined hydrogen per mole of halogen chemically bonded to silicon metal. Although amounts in excess of the about 1.1 moles can be employed, there is usually no advantage in doing so.

Although the order of addition of the various reactants is not especially crucial, it is preferred to add the organosilicon halide to the organometallic hydride and the alkali metal hydride, if employed.

During the addition, agitation of the mixture can be employed as well as the use of a solvent. In certain instances, the organosilicon halide can be employed as a solvent. It is preferred, however, to employ a substantially inert organic solvent such as ethers such as tetrahydrofuran; aliphatic hydrocarbons such as hexane, heptane, mineral oil and hexadecane; aromatic hydrocarbons such as benzene, toluene, and xylene; etc. A substantially inert organic solvent is a solvent which is substantially inert to the reactants under reaction conditions.

A temperature in the range of between about −20° C. to 150° C. can be employed. It is preferred, however, to utilize a temperature between 100° C. to 150° C. Depending upon such factors as the conditions utilized, proportions of reactants, etc., a reaction time of as little as ½ hour or less, to 3 hours or more, will not be unusual. The course of the reaction can be followed by examining samples of the reaction mixture periodically by by use of a vapor phase chromatograph. The resulting organosilicon hydride is recovered from the mixture by distillation, etc.

In order that those skilled in the art will better understand the present invention, the following nonlimiting examples are given wherein all parts are by weight unless the contrary is stated:

EXAMPLE 1

To a slurry containing 9.6 parts of sodium hydride as a 57% suspension in mineral oil, and 50 parts of xylene and under a nitrogen atmosphere are added all at once 16 parts of a 25% solution of sodium aluminum diethyl hydride in xylene. The reaction mixture is then heated by an external source to 110° C. There is then added dropwise 50.6 parts of diphenyldichlorosilane. A very strong exotherm occurs and the external heat source is removed. The temperature is controlled by the rate of addition of the diphenyldichlorosilane and is maintained between 130 and 145° C. Towards the end of the addition, the temperature begins to drop and ends up at 125° C. After this, heat is applied for an additional two hours to maintain the reaction temperature at 125° C. The reaction mixture is then distilled, collected, and condensed. The product as determined by the method of preparation, I.R. spectrum, and VPC analysis is 93% diphenyl silane, 4% diphenylmonochlorosilane and 2% diphenyldichlorosilane.

EXAMPLE 2

To a slurry containing 7.2 parts of sodium hydride as a 49% suspension in mineral oil, and 50 parts mineral oil and under a nitrogen atmosphere are added all at once 8 parts of a 25% solution of sodium aluminum diethyl hydride in xylene. No reaction was evident. The reaction mixture is then heated by an external source to 110° C. There is then added dropwise 21.9 parts of hexyltrichlorosilane. A very strong exotherm occurs and the external heat source is removed. The temperature is controlled by the rate of addition of the chlorosilane and is maintained between 95–115° C. Toward reaction completeness, external heat is applied to maintain the reaction temperature at 115° C. for two additional hours. Upon fractionation there is obtained 10.4 parts hexyl silane at a boiling point between 118–122° C. This is a 90% yield. Its identification is confirmed by infrared analysis.

What is claimed is:

1. A method for making silicon hydrides which comprises reacting:
   (A) an effective amount of organometallic hydride having the structural formula:

$$L(MeH_zR^2_{4-z})_y$$

wherein L is selected from the group consisting of alkali metals and alkaline earth metals; $y$ is the valence of L; Me is a Group III-A metal; $R^2$ is a monovalent hydrocarbon radical selected from the group consisting of alkyl radicals, aryl radicals, cycloalkyl radicals, aralkyl radicals and alkaryl radicals, and mixtures thereof; and $z$ is a whole number integer from 1 to 3; and
   (B) silicon halide selected from the class consisting of organohalosilanes of the formula:

$$R_aSiH_bX_{(4-a-b)}$$

and bis(halosilyl)hydrocarbon of the formula $$_{(3-c-d)}XH_cR_dSiR'SiR_eH_fX_{(3-e-f)}$$

where R is selected from monovalent hydrocarbon radicals and halogenated monovalent hydrocarbon radicals; R' is a divalent hydrocarbon radical; X is a halogen radical; $a$ is an integer equal to from 1 to 3, inclusive; $b$ is a whole number which has a value equal to 0 to 2, inclusive; $c$ is a whole number which has a value equal to 0 to 2, inclusive; $d$ is a whole number which has a value equal to from 0 to 2, inclusive; $e$ is a while number which has a value equal to 0 to 2, inclusive; $f$ is a whole number which has a value equal to 0 to 2, inclusive; the sum of $a$ and $b$ has a value equal to 1 to 3, inclusive; the sum of $c$ and $d$ has a value equal to 0 to 2, inclusive; and the sum of $e$ and $f$ has a value equal to 0 to 2, inclusive.

2. The method of claim 1 which further includes the presence of an alkali metal hydride.

3. The process of claim 2 wherein the amount of said organometallic hydride provides from about 0.01 mole to about 1 mole of chemically combined hydrogen per mole of halogen chemically bonded to silicon metal.

4. The process of claim 2 wherein said alkaline metal hydride is sodium hydride.

5. The process of claim 4 wherein said organometallic hydride is sodium diethyl aluminum hydride.

6. The method of claim 1 wherein Me is aluminum or boron.

7. The method of claim 1 wherein L is sodium.

8. The method of claim 1 wherein said organometallic hydride is sodium diethyl aluminum hydride.

9. The method of claim 1 wherein $R^2$ is selected from the group consisting of alkyl radicals of 1 to about 18 carbon atoms, aryl radicals of from about 6 to 14 carbon atoms, cyclo-alkyl radicals of from about 3 to 12 carbon atoms, aralkyl radicals of from 7 to about 18 carbon atoms, and alkaryl radicals of from 7 to about 18 carbon atoms, and mixtures thereof.

10. The process of claim 1 wherein an inert organic solvent is employed.

11. The process of claim 1 wherein said inert organic solvent is an aromatic hydrocarbon.

12. A method is accordance with claim 1 where the organosilicon halide is an organohalosilane of the formula:

$$R_aH_bSiX_{(4-a-b)}$$

where R is selected from monovalent hydrocarbon radicals and halogenated monovalent hydrocarbon radicals; X is a halogen radical; $a$ is an integer equal to from 1 to 3, inclusive; $b$ has a value equal to 0 to 2, inclusive; and the sum of $a$ and $b$ has a value equal to 1 to 3, inclusive.

13. A method in accordance with claim 1 wherein the organosilicon halide is a bis(halosilyl)hydrocarbon of the formula:

$$_{(3-c-d)}XH_cR_dSiR'SiR_eH_fX_{(3-e-f)}$$

where R is selected from monovalent hydrocarbon radicals and halogenated monovalent hydrocarbon radicals; R' is a divalent hydrocarbon radical; X is a halogen radical; $c$ has a value equal to 0 to 2, inclusive; $d$ has a value equal to from 0 to 2, inclusive; $e$ has a value equal to 0 to 2, inclusive; $f$ has a value equal to 0 to 2, inclusive; the sum of $c$ and $d$ has a value equal to 0 to 2, inclusive; and the sum of $e$ and $f$ has a value equal to 0 to 2, inclusive.

14. The method of claim 1 wherein said organosilicon halide is diphenyldichlorosilane.

15. The method of claim 1 wherein said organosilicon halide is hexyl trichlorosilane.

References Cited
UNITED STATES PATENTS

| | | | |
|---|---|---|---|
| 3,439,008 | 4/1969 | Berger | 260—448.2 E X |
| 3,496,206 | 2/1970 | Berger | 260—448.2 E |
| 3,499,020 | 3/1970 | Robinson | 260—448.2 E |
| 3,607,896 | 9/1971 | Michael | 260—448.2 E |
| 3,607,897 | 9/1971 | Michael | 260—448.2 E |

JAMES E. POER, Primary Examiner

P. F. SHAVER, Assistant Examiner

U.S. Cl. X.R.

260—448.2 H